Figure 1:
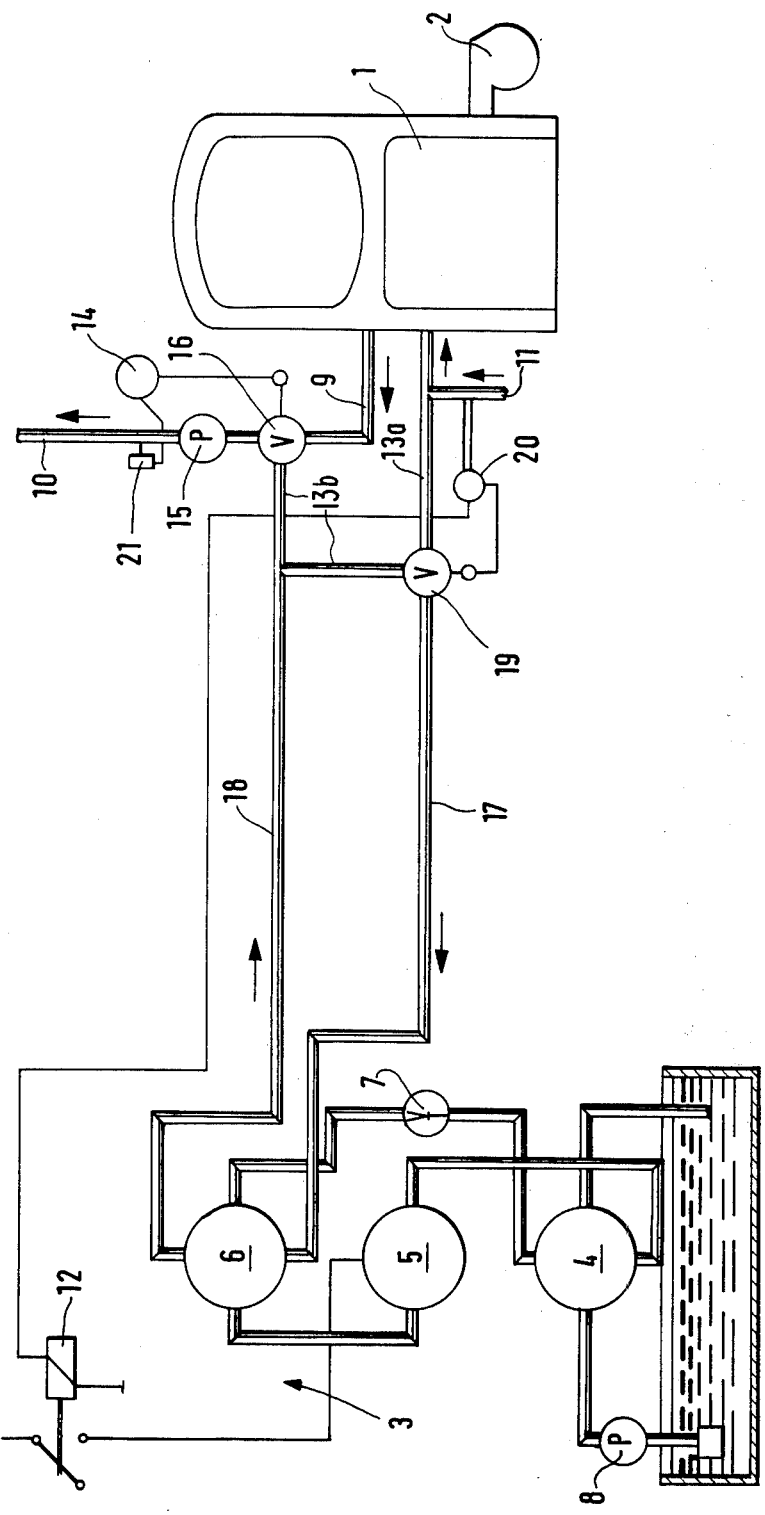

United States Patent [19]

Vogt

[11] 4,052,001
[45] Oct. 4, 1977

[54] HEATING SYSTEM
[75] Inventor: Alfred Vogt, Schaan, Liechtenstein
[73] Assignee: Interliz Anstalt, Vaduz, Liechtenstein
[21] Appl. No.: 723,607
[22] Filed: Sept. 15, 1976
[30] Foreign Application Priority Data
Oct. 1, 1975 Austria .................................. 7516/75
[51] Int. Cl.² .............................................. F24D 3/00
[52] U.S. Cl. ................................... 237/1 A; 237/2 B; 237/8 R; 126/271; 126/400; 165/29
[58] Field of Search ............... 237/1 A, 8 R, 2 B, 61; 126/271, 400; 62/238.2; 219/279, 282, 341, 365, 378; 165/29

[56] References Cited
U.S. PATENT DOCUMENTS

| 2,781,174 | 2/1957 | Smith | 237/8 R |
|---|---|---|---|
| 3,984,050 | 10/1976 | Gustafsson | 237/2 B |
| 3,986,664 | 10/1976 | Gustafsson | 237/2 B |
| 3,989,183 | 11/1976 | Gustafsson | 237/8 R |
| 3,996,759 | 12/1976 | Meckler | 237/1 A |
| 4,007,776 | 2/1977 | Alkasab | 62/2 |
| 4,012,920 | 3/1977 | Kirchbaum | 126/400 |

FOREIGN PATENT DOCUMENTS 2,403,330  8/1975  Germany ............................ 237/2 B Primary Examiner—John J. Camby
Assistant Examiner—Henry C. Yuen
Attorney, Agent, or Firm—Hans Berman

[57] ABSTRACT

The water for a central heating system is supplied with thermal energy in a boiler equipped with an oil burner and with a thermostatically controlled mixing valve that mixes the water heated in the boiler with water from a return line by-passing the boiler to maintain a desired temperature in the heating fluid. A secondary heat source (heat pump, wood-burning boiler, solar unit) is connected to the by-pass and automatically actuated when it can effectively relieve the oil burning boiler.

9 Claims, 3 Drawing Figures

HEATING SYSTEM

This invention relates to heating systems, and particularly to a heating system employing a primary heating unit deriving thermal energy from the combustion of fossil material together with a secondary unit capable of utilizing other energy sources.

Dual heating systems of the type generally described above were limited heretofore to large industrial installations because of the complex and costly controls needed for their automatic operation and the skill needed for using them in the absence of automatic controls.

The primary object of this invention is the provision of a dual heating system simple enough to be installed even in one-family homes at acceptable cost, yet capable of fully automatic operation and of satisfactory utilization of the secondary energy source.

The invention relies on a modification of a conventional heating system in which a heater supplies thermal energy to a heat transfer fluid. A return line and a discharge line are connected to the heater to feed thereto the fluid to be heated and for withdrawing the heated fluid therefrom. A by-pass line connects the return line to a mixing valve in the discharge line. According to this invention, respective portions of the by-pass line are connected to two of the three ports of a three-way valve. A secondary heater for supplying thermal energy to the same heat transfer fluid is connected to an intake line feeding thereto the fluid to be heated, and to an output line which withdraws heated fluid. Either the intake or the output line communicates permanently with one of the first and second ports of the three-way valve, and the other line communicates permanently with the third port of the valve.

The invention will be described hereinbelow with reference to an oil burning boiler as the primary source of thermal energy, and to hot water as the heat transfer fluid. However, the invention is equally applicable to heating installations burning primarily other fossil fuels, such as coal or peat which are undesirable not because of high cost and limited availability, but because of undesirable combustion products. Natural and manufactured gas are obvious substitutes for oil in the heating system of the invention. The choice of secondary sources of thermal energy is wide and controlled mainly by the desired effect. A heat pump, a wood burning boiler, and a collector for solar thermal energy will be described as typical examples, but renewable fuels other than wood, such as straw and garbage, geothermal energy, and the like may be resorted to in heating systems within the scope of this invention.

The heat transfer fluid which transports the thermal energy from the primary and secondary sources of thermal energy to the space to be heated will be described as hot water fed to radiators. The invention is readily applied to steam or air as a heat transfer fluid, and others will suggest themselves under suitable conditions.

The specifically described embodiments of the invention are central heating systems for relatively small buildings for which practical dual heating systems were not available heretofore. However, the illustrated and described systems are readily scaled up for producing amounts of heated fluid suitable for heating large buildings or for operating external combustion engines. The use of tertiary and additional heaters using each a different fuel is specifically contemplated.

Figure 2:
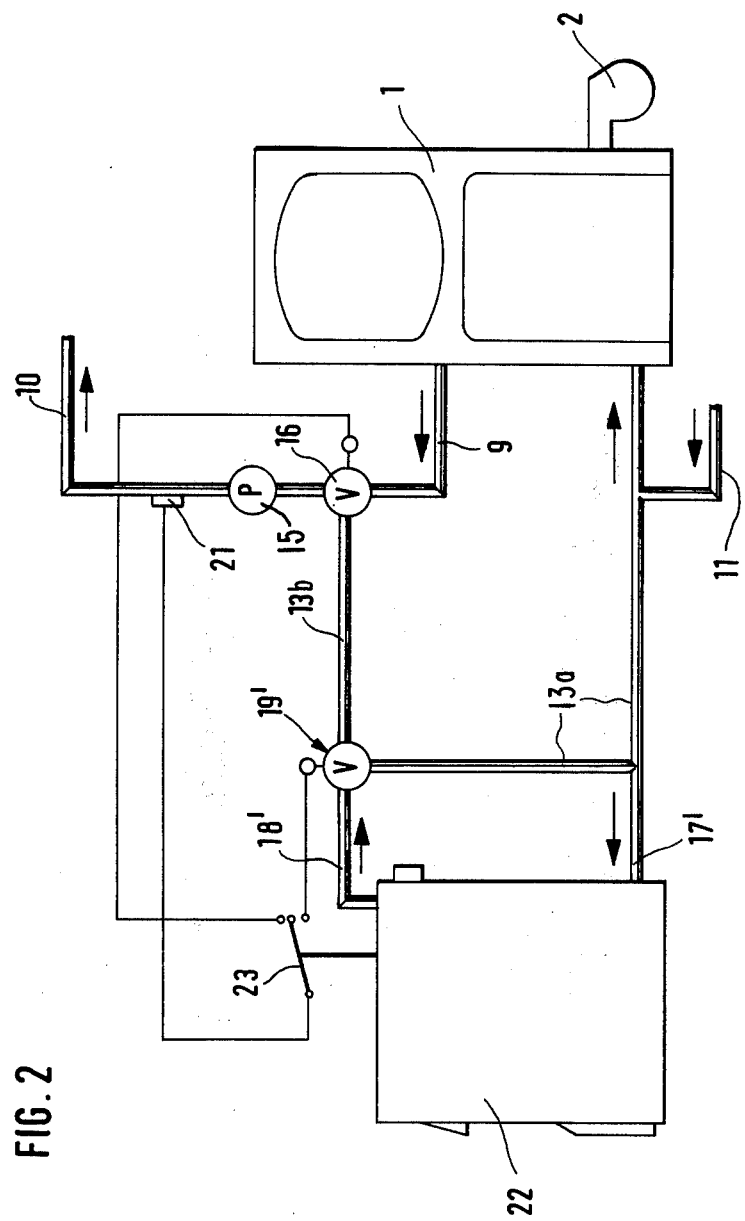
Figure 3:
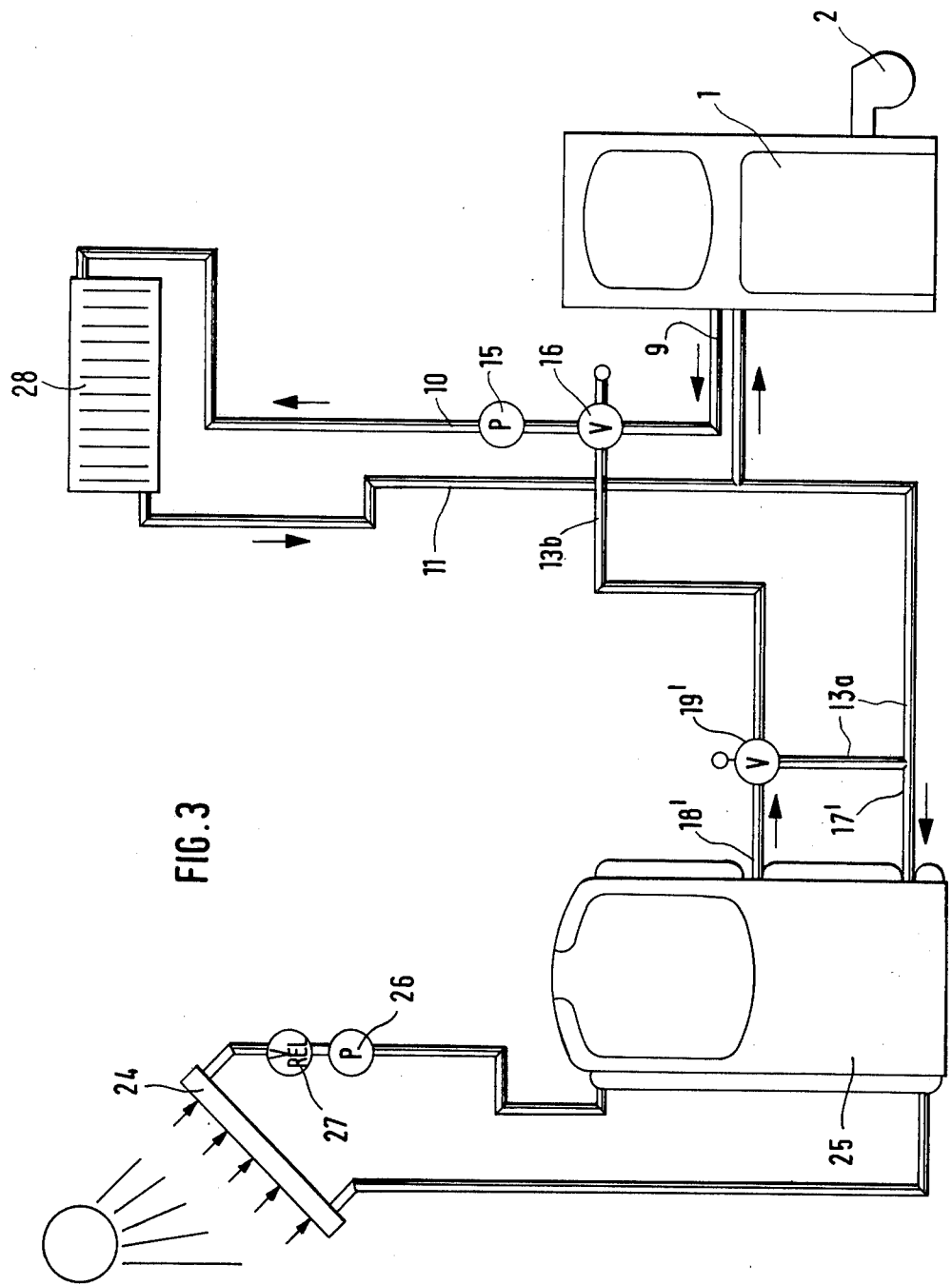

Other features, additional objects, and many of the attendant advantages of this invention will readily be appreciated as the same becomes better understood by reference to the following detailed description of preferred embodiments when considered in connection with the appended drawing in which:

FIG. 1 shows a heating system of the invention combining a heat pump with an oil-burning boiler, by conventional symbols;

FIG. 2 similarly shows a heating system combining a wood-burning boiler with an oil-burning boiler; and FIG. 3 is a corresponding view of a heating system combining a solar heating plant with an oil-burning boiler.

Referring initially to FIG. 1, there is seen a heating system in wich circulating water is heated by a boiler 1 equipped with an oil burner 2 and by a heat pump 3. As is conventional and not shown in detail, a refrigerant is circulated from an evaporator 4 through a compressor 5 to a condenser 6 from which it returns to the evaporator through an expansion nozzle 7. The cold refrigerant vapor in the evaporator 4 is heated by ground water drawn from the subterranean water table by a pump 8, and returned to the ground after heat exchange in the evaporator 4.

The discharge line 9 of the boiler 1 is connected to one of the input ports of a mixing valve 16. A heating line 10 leads from the output port of the valve 16 to non-illustrated radiators and is equipped with a circulating pump 15. A desired temperature of the heated water is maintained by a thermostat 21 in the line 10, as will presently be described in more detail. The water cooled in the radiators is returned to the boiler 1 through a return line 11 and may by-pass the boiler through a by-pass line whose two portions 13a, 13b are connected respectively to first and and second ports of a three-way valve 19. Cool, returned water may be led by the by-pass line 13a, 13b to the second input port of the mixing valve 16 to reduce the temperature of the water in the heating line 10 below that in the output line 9 of the boiler.

The condenser 6 is connected by an intake line 17 to the third port of the three-way valve 19, and by an output line 18 with the by-pass line portion 13b so that the lines 17, 18 permanently communicate with the second and third ports of the valve 19. A thermostat 20 in the return line 11 controls the three-way valve 19 and a starting relay 12 in the energizing circuit of the compressor 5 whose contacts are normally closed. The mixing valve 16 is biased toward a position in which it connects the heating line 10 to the by-pass line 13 and the output line 18 of the heat pump 3 while blocking the discharge line 9 of the boiler 1. The three-way valve 19 is biased to connect its first port and the return line 11 to the third port and the intake line 17 of the heat pump 3.

The heating system is started by a manually operated main switch and/or a non-illustrated room thermostat controlling magnetic switches for the oil burner 2, the compressor 5, and the pumps 8, 15. The discharge of water from the boiler 1 being blocked at the mixing valve 16, the water in the boiler is brought to a temperature set in a conventional manner on a non-illustrated thermostat which controls the burner 2, and water entering the heating line 10 is heated initially by the heat pump 3 alone.

A timer switch 14 connects the thermostat 21 to the mixing valve 16 after a delay, but the position of the valve is not changed if the heat pump 3 can maintain the heating water temperature for which the thermostat 21 is set. If the temperature of the water in the line 10 is too low, the valve 16 opens the discharge line 9 to mix hot water from the boiler 1 with the output of the heat pump 3.

As the temperature of the rooms heated by the non-illustrated radiators increases, the temperature of the water returned to the heating system through the line 11 ultimately reaches a value at which the returned water can no longer be further heated in the condenser 6. When this temperature is reached, the thermostat 20 deenergizes the compressor 5 at the relay 12 and shifts the valve 19 to a position in which it connects the return line 11 to the valve 16 through first and second ports. The returned water thereafter is mixed with the output of the boiler 1 which carries the full heating load.

When the heated rooms reach the temperature set on their non-illustrated thermostat, the heating system is shut off, and a new heating cycle begins when the room temperature reaches its low limit.

The heating system illustrated in FIG. 2 includes a boiler 1 heated by means of an oil burner 2. Its discharge line 9 is connected to one input port of a mixing valve 16 whose output port is connected with a heating line 10 equipped with a circulating pump 15 and a thermostat 21, substantially as described with reference to FIG. 1. The water cooled in non-illustrated radiators again may enter the boiler 1 through a return line 11. A by-pass line 13a, 13b connects the return line 11 to the mixing valve 16 through respective first and second ports of another three-way mixing valve 19' which may receive water from the return line 11 through its first port and-/or from the output line 18' of a wood-burning boiler 22 through its third port. The intake line 17' of the boiler 22 permanently communicates with the first port of the valve 19' connected to the return line 11.

The output signal of the thermostat 21 is fed to a thermally operated selector switch 23 on the boiler 22 which is spring-biased to connect the thermostat 21 to the mixing valve 16, but connects the thermostat 21 to the three-way valve 19' when the boiler 22 is heated.

When the wood-burning boiler 22 is hot enough, the mixing valve 16 is deenergized by the switch 23, and its biasing spring causes the discharge line 9 of the boiler 1 to be blocked. The oil burner 2 holds the boiler 1 at a stand-by temperature, but does not contribute thermal energy to the heating water in the line 10. Hot water is produced in the wood-burning boiler 22 and mixed with water returned from the radiators by the valve 19' to maintain a desired temperature in the heating line 10. When the wood fire in the boiler 22 is permitted to go out, the oil-burning boiler 1 takes over in the same manner as described with reference to FIG. 1.

The heating system illustrated in FIG. 3 differs from that described with reference to FIG. 2 mainly by the wood-burning boiler 22 being replaced by a solar heating panel 24 and a heat exchanger 25. A heating fluid is circulated through the panel and the heat exchanger by a pump 26, and a one-way valve 27 prevents hot heating fluid from rising to the panel 24 by a thermal syphon effect when the sun does not heat the panel.

As in the heating system illustrated in FIG. 2, a boiler 1 is provided with an oil burner 2 to feed heated water through a discharge line 9, a mixing valve 16, and a heating line 10 equipped with a pump 15 to a radiator 28, implied but not illustrated in FIGS. 1 and 2. The cool water flowing from the radiator 28 through a return line 11 again enters the boiler 1, but may be by-passed directly to the heating line 10 through a by-pass line whose portions 13a, 13b are connected respectively to the first and second ports of another three-way mixing malve 19', and through the mixing valve 16.

The water coil in the heat exchanger 25 is permanently connected to the first port of the valve 19' communicating with the return line 11 by an intake line 17', and the output line 18' of the heat exchanger leads to the third port of the mixing valve 19'. As is not specifically illustrated in FIG. 3, but evident from FIG. 2, the mixing valves 16, 19' are controlled alternatively by a thermostat in the heating line 10 and by a selector switch responding to the temperature of the heating fluid in the heat exchanger 25.

As long as solar energy is available in the heat exchanger 25 to maintain the water line 10 at the necessary temperature, typically 55° C, the oil-burning boiler 1 is held in standby condition. When the available solar energy is insufficient, and the heating fluid is too cold, the boiler 1 takes over.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A heating system comprising:
    a. first heating means for supplying thermal energy to a fluid to be heated;
    b. a return line and a discharge line respectively connected to said heating means for feeding thereto the fluid to be heated and for withdrawing the heated fluid therefrom;
    c. a mixing valve in said discharge line;
    d. a three way valve having a first, a second, and a third port;
    e. a by-pass line connecting said return line to said mixing valve, respective portions of said by-pass line connecting said return line to said first port and said second port to said mixing valve;
    f. second heating means for supplying thermal energy to said fluid; and
    g. an intake line and an output line connected to said second heating means for feeding thereto the fluid to be heated and for withdrawing the heated fluid therefrom, one of said intake and output lines communicating permanently with one of said first and second ports, and the other one of said intake and output lines communicating permanently with said third port.

2. A heating system as set forth in claim 1, wherein said intake line communicates permanently with said third port, and said output line communicates permanently with said second port.

3. A heating system as set forth in claim 1, wherein said intake line communicates permanently with said first port, and said output line communicates permanently with said third port.

4. A heating system as set forth in claim 1, further comprising temperature-responsive means in said discharge line operatively connected to at least one of said valves for maintaining a selected temperature in said discharge line by mixing in said at least one valve said heated fluid with fluid received from said return line through said by-pass line.

5. A heating system as set forth in claim 4, further comprising selector means for alternatively connecting said valves to said temperature-responsive means in response to a thermal condition of said second heating means.

6. A heating system as set forth in claim 1, wherein said first heating means includes means for generating said thermal energy by combustion of fossil fuel, and said second heating means includes a heat pump.

7. A heating system as set forth in claim 1, wherein said first heating means includes means for generating said thermal energy by combustion of fossil fuel, and said second heating means includes a collector of solar, thermal energy.

8. A heating system as set forth in claim 1, wherein said first heating means includes means for generating said thermal energy by combustion of fossil fuel, and said second heating means includes means for generating said thermal energy by combustion of renewable fuel.

9. A heating system as set forth in claim 8, wherein said renewable fuel is wood.

* * * * *